Jan. 30, 1973                K. GASBJERG                3,713,850
                        CHEESE TREATING SYSTEMS
Filed Sept. 8, 1971                                2 Sheets-Sheet 1

INVENTOR.

KNUD GASBJERG

BY Craig, Antonelli & Hill
                ATTORNEYS.

Jan. 30, 1973   K. GASBJERG   3,713,850
CHEESE TREATING SYSTEMS

Filed Sept. 8, 1971   2 Sheets-Sheet 2

INVENTOR

KNUD GASBJERG

BY Craig, Antonelli & Hill
ATTORNEYS.

United States Patent Office 3,713,850
Patented Jan. 30, 1973

3,713,850
CHEESE TREATING SYSTEMS
Knud Gasbjerg, Herningvej 74, Silkeborg, Denmark
Filed Sept. 8, 1971, Ser. No. 178,707
Int. Cl. A23c *19/02*
U.S. Cl. 99—452
10 Claims

ABSTRACT OF THE DISCLOSURE

For use in cheese production, a system for treating cheeses with a liquid medium such as salt brine, comprising a plurality of relatively flat trays each having a height or depth slightly exceeding the thickness of the cheeses to be treated and each being able to receive one layer of cheeses, said trays being stackable into a pile of trays, means being provided for supplying brine to the uppermost tray whereby when this tray is full the brine will be let out through an overrun down into the next tray for filling the same, and so forth all the way down through the pile whereby all cheeses in the trays will be subjected to the brine. Preferably, in order to facilitate emptying of the trays, each tray has one or more narrow bottom holes through which, after closing of the brine supply to the uppermost tray, the rest of the brine may leave the single trays down into the underlying tray whereby the trays will be consecutively emptied. The tray pile or piles are easily movable by means of e.g. a fork truck whereby the system contributes to an easy handling of the cheeses.

---

The present invention relates to a method and means for the salting or similar curing of cheeses such as involved in usual cheese production. Hitherto it has been common practice to use a so-called brine tub in which the cheeses are stored for as long a time as necessary for the treatment, but the handling of the cheeses is rather difficult, and the price of the brine tub installation is considerable. Furthermore, the effective treating time may be longer for the cheeses first filled into the tub than for the last cheeses, and the cheeses can be liable to pack together so that certain surface portions thereof are not subjected sufficiently to the treating liquid.

The invention has for its purpose to provide a salting or similar system enabling an easy handling of the cheeses and a relatively low price of the installation.

The system according to the invention is characterised by the use of a number of stackable trays which are operable to be placed in a pile, each tray having an overrun from which liquid medium supplied to the tray after filling of the tray will run down into the tray therebeneath, whereas means are provided for supplying liquid medium to the uppermost tray. It is easy to place one or more cheeses in the single trays and to pile the trays, and when therafter the brine is supplied it will fill the uppermost tray and thereafter consecutively fill all the other trays so that the cheeses are subjected to the desired treatment. Drain openings may be provided in the trays so that these are emptied when the supply of brine is stopped. Thereafter the trays are easy to move, and they may even be used as transport containers for the cheeses in the internal transport system.

These and other details and advantages of the invention will appear from the following description, reference being made to the accompanying drawing, in which.

Figure 1:
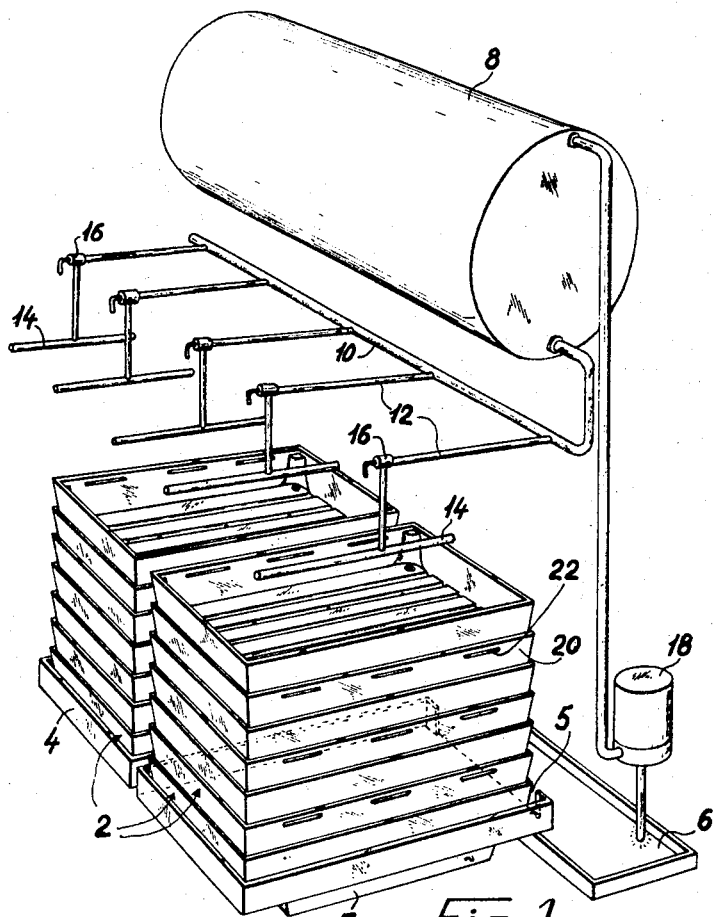
FIG. 1 is a perspective view of a salting system according to the invention.

The system shown comprises a number of trays 2 each adapted to be loaded with one or more cheeses preferably in a single layer only and being piled in a number of piles, each pile being supported on a bottom supporting tray 4. These supporting trays are provided with a side opening 5 communicating with a stationary tray 6, so that all liquid collected on the trays 4 is passed further to the tray 6. Furthermore, the supporting trays 4 are supported on spaced foot members 7 so as to be engageable by the forks of a lifting cart whereby each entire pile of trays 2 is easily movable in the plant. A stationary brine tank 8 is mounted above the top of the piles and provided with an outlet tube 10, which is in its turn provided with a number of tube branches 12 supplying brine to a corresponding number of distributor tubes 14 overhead each of the piles, valves 16 being provided so as to enable the operator to open for the brine supplied to those tube 14 only, below which there are actually placed a pile of trays 2.

A pump 18 serves to return the brine from the stationary tray 6 to the top of the tank 8.

The trays 2 are shown with a rectangular elongated configuration and outwardly inclined side walls. Adjacent the top of one of the longer sides 20 of each tray there is provided a row of slots 22 serving as overrun holes; these slots may be substituted by round holes or by notches in the top edge of the tray side. In a preferred embodiment the trays are made of fibre reinforced artificial resin, but, of course, also other materials may be used.

Figure 2:
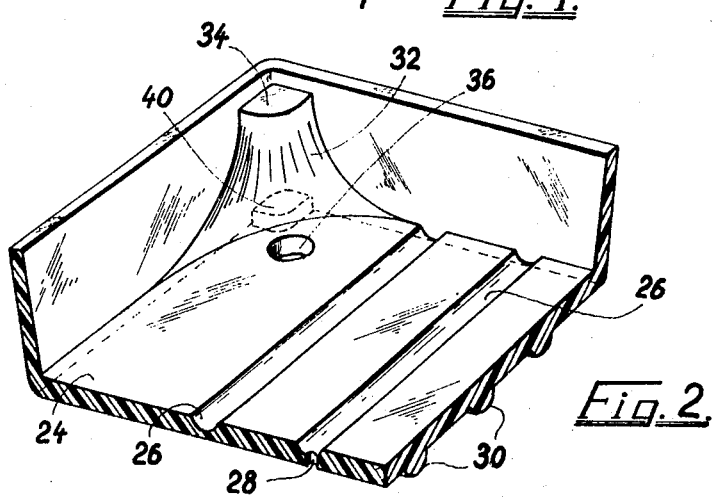
FIG. 2 is a perspective view of a corner portion of one of the trays shown in FIG. 1.
Figure 3:
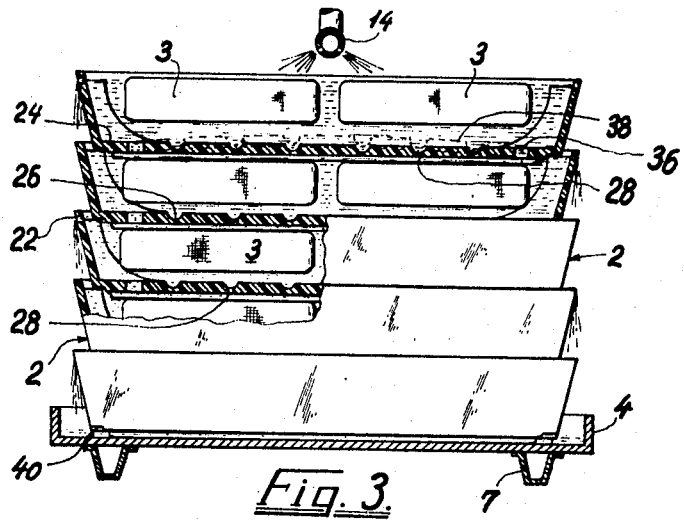
FIG. 3 is an end view, partly in section, of the pile of trays.
Figure 4:
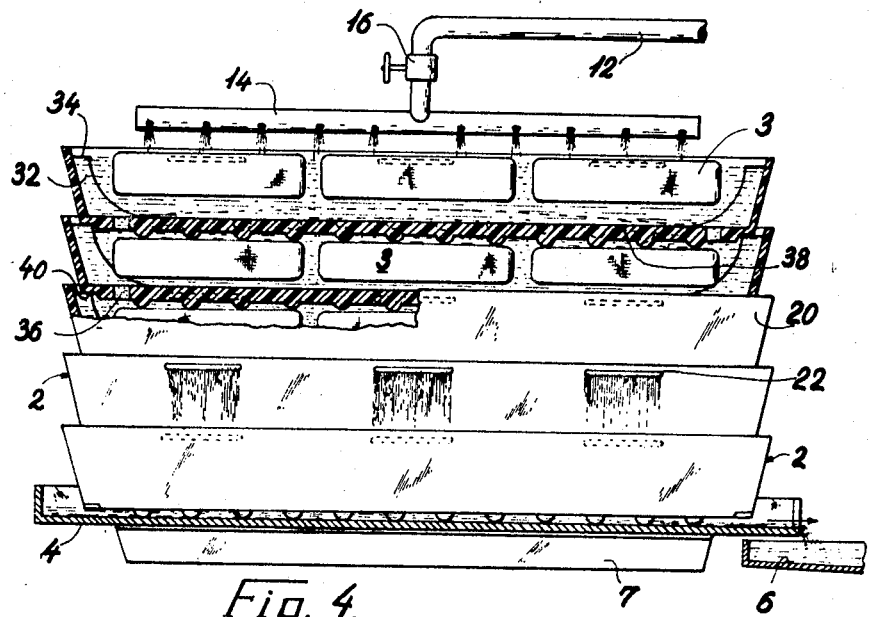
FIG. 4 is a side view, partly in section, of the pile.

As most clearly shown in FIG. 2 the tray bottom, designated 24, has in its top side a number of longitudinal grooves 26 at the bottom of which there is at a few places provided a hole 28 through the tray bottom; these holes, e.g. in a number of six for each tray, may be vertical as shown in FIG. 2, but as explained below it may be advantageous to let the holes extend in an oblique direction. The lower side of the bottom 24 is provided with a number of transverse ribs 30. In each of the tray corners there is provide a thickened portion 32 having an upper support surface 34 located slightly spaced underneath the top edge of the tray. Adjacent each corner the bottom 24 is provided with a hole 36, and preferably—as shown with dotted lines at 38 in FIGS. 3 and 4—the entire bottom 24 is slightly upwardly concave so as to have its middle portion located in a level above that of the bottom sides and corners. In this manner it will be ensured that the tray will be emptied through the corner holes 36 when the supply of liquid to the tray is stopped.

Adjacent the corners of the lower side of the tray bottoms have a recess 40 adapted to cooperate with the carrier platform 34 in the corresponding corner of the underlying tray in the pile; in this manner each tray is supported by the underlying tray and centered relatively thereto so that between the exterior tray sides and the interior side of the underlying tray there will be a certain free space due to the inclination of the sides.

When brine is supplied from the distributor tubes 14 to the uppermost tray 2 in each pile these trays will start to be filled wth brine around the cheeses 3 located therein; the holes 28 in the bottom of the trays are not wide enough to cause the brine to be drained off as fast as it is supplied, but, of course, some brine will pass to the underlying trays through the holes 28. When the uppermost tray has been filled the brine will run out through the overflow holes 22 and thus down into the underlying tray through the said free space. Hereby the filling of the next tray is accelerated. In this manner all trays in the piles will soon be filled with brine and when also the lowermost tray has been filled the brine will be drained off to the stationary tray 6 by means of the supporting tray 4 and returned to the tank 8 by means of the pump 18. It will be understood that the trays 2 will remain constantly filled with brine as long as a sufficient brine supply is maintained through the tubes 14, and in this manner the cheeses may be subjected to the treatment during any required time interval.

Normally, the brine used for salting is relatively concentrated so that the cheeses will be lifted up in the trays. It will be noted that the ribs 30 serve as means for preventing a surface contact between the top sides of the cheeses and the underside of the overlying tray bottom 24 so that the entire surface of the cheeses will be subjected to the brine. The holes 28 are disposed offset from the ribs 30 so that they are not choked by the top side of the cheeses. The system may also be used for cooling the cheeses by means of water prior to the salting treatment. In this case the cheeses will normally remain on the bottom of the trays.

When it is desired to stop the treatment the valves 16 are closed whereafter all trays in the pile will be emptied through the holes 28 and 36. As mentioned the trays may thereafter be moved away by means of a lift cart having fork means engaging under the bottom tray 4.

Several modifications will be possible within the scope of the invention; for example, the overrun holes 22 may be avoided if the top edge of the particular side is situated below the top edge of the other tray sides. The tray piles may be supported on conveyor means so as to be moved past the brine supply means, whereby the duration of the treatment may be determined by the moving velocity of the conveyor.

As shown in the drawings the holes 22 are preferably provided in one side of the trays only, and the trays are piled in such a manner that the particular sides alternate down through the pile. Hereby there will occur a horizontal flow of liquid through the trays which serves to intensify the treatment of the cheese. This flow will not be obstructed by the ribs 30 since these are orientated in the direction of the said flow. As mentioned, the small drain holes 28 may be provided with an inclined direction whereby the outflow therefrom will cause an orientated flow of liquid along the top surface of the underlying cheese, this also for intensifying the treatment of the cheeses.

Figure 5:
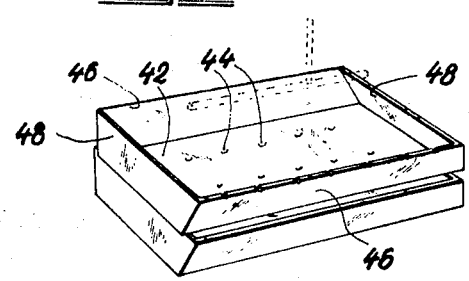
FIG. 5 is a perspective view of a pair of trays with modified shape.

In FIG. 5 is shown a pair of modified trays made of plate material. In the bottom plate 42 there may be provided downwardly protruding beads 44 substituting the ribs 30 in the embodiment described above, and the drain holes 28 may be drilled through the walls of these beads. The two opposed longer sides 46 are inclined upwardly-outwardly as above, but the shorter sides 48 are inwardly inclined so that each tray can be carried directly on the short top edges of the underlying tray.

What is claimed is:

1. A system for treating cheeses with a liquid medium, including container means for receiving a number of cheeses and an amount of liquid medium, characterised in that the container means comprise a number of stackable trays which are operable to be placed in a pile, each tray having an overrun from which liquid medium supplied to the tray after filling of the tray will run down into the tray therebeneath, and means are provided for supplying liquid medium to the uppermost tray.

2. A system according to claim 1, in which in the bottom of each tray there is provided at least one draining hole.

3. A system according to claim 1, in which the undersides of the trays are provided with downwardly directed, narrow protrusions.

4. A system according to claim 1, in which the top side of each tray bottom is provided with a number of grooves.

5. A system according to claim 1, in which the tray bottoms are of slightly concave configuration and provided with draining holes adjacent the corners thereof.

6. A system according to claim 1, in which said overrun is provided at one side of each tray, whereas the trays are operable to be stacked with the overruns located alternating at opposite sides of the pile.

7. A system according to claim 6, in which at least two opposed sides of each tray are upwardly-outwardly inclined, whereas the said overruns are provided as simple overflow holes adjacent the top edge of one of said two opposed sides.

8. A system according to claim 1, and further comprising a liquid medium tank mounted in a level above that of the uppermost tray in the pile, said tank having an outlet pipe for supplying liquid medium to said uppermost tray, whereas underneath the tray pile there is provided means for collecting liquid medium leaving the tray pile, and pump means being provided for pumping up liquid medium from said collecting means to said tank.

9. A system according to claim 1, in which the said tray pile has a lowermost tray constituting a pallet like support for the pile.

10. A system according to claim 9, in which said liquid medium collecting means are constituted by a stationary trough operable to receive liquid medium from said lowermost tray.

References Cited

UNITED STATES PATENTS

| | | | |
|---|---|---|---|
| 1,454,856 | 5/1923 | O'Brien | 99—417 X |
| 2,366,553 | 1/1945 | Petersen | 99—116 |
| 2,492,878 | 12/1949 | Miollis | 99—243 X |
| 2,654,151 | 10/1953 | Miollis | 99—243 X |
| 3,055,287 | 9/1962 | Henry | 99—346 |
| 3,355,054 | 11/1967 | Wilson | 220—23.6 |
| 3,424,334 | 1/1969 | Goltz | 220—23.6 |

FOREIGN PATENTS

| | | | |
|---|---|---|---|
| 118,241 | 3/1901 | Germany | 99—449 |
| B 35,042 | 11/1956 | Germany | 99—423 |

BILLY J. WILHITE, Primary Examiner

A. O. HENDERSON, Assistant Examiner

U.S. Cl. X.R.

99—535